United States Patent [19]
Jefferson

[11] Patent Number: 5,931,355
[45] Date of Patent: Aug. 3, 1999

[54] DISPOSABLE ROTARY MICROVALVE

[75] Inventor: Richard L. Jefferson, Garden Grove, Calif.

[73] Assignee: Techcon Systems, Inc., Carson, Calif.

[21] Appl. No.: 08/869,015

[22] Filed: Jun. 4, 1997

[51] Int. Cl.⁶ .............................. G01F 11/20; B65D 88/54
[52] U.S. Cl. ......................... 222/413; 222/412; 222/309; 222/410; 222/282
[58] Field of Search .................................. 222/309, 413, 222/412, 410, 282

[56] References Cited

U.S. PATENT DOCUMENTS

| | | | |
|---|---|---|---|
| 4,953,756 | 9/1990 | Breault et al. ........................... | 222/309 |
| 5,564,606 | 10/1996 | Engel ...................................... | 222/413 |
| 5,609,275 | 3/1997 | Brown et al. ........................... | 222/413 |
| 5,613,624 | 3/1997 | Grzybowski et al. .................. | 222/413 |
| 5,655,692 | 8/1997 | Navin et al. ............................ | 222/413 |
| 5,669,531 | 9/1997 | Hagemeyer ............................ | 222/413 |

Primary Examiner—Andres Kashnikow
Assistant Examiner—Keats Quinalty
Attorney, Agent, or Firm—Beehler & Pavitt

[57] ABSTRACT

A novel motor controlled microvalve dispenser includes a body section through which fluid, e.g., adhesives, epoxies, fluxes solder pastes, for example, is accurately dispensed as a dot or bead or other shape, all of a predetermined dimension. The housing includes a removable and replaceable insert which prevents any of the fluid from contacting any of the interior walls of the housing or of the infeed passage. The insert includes both an infeed passage which extends out of the housing and an outlet passage also extending out of the housing, the insert including a bore into which a feed screw or auger is sealingly positioned for rotation by the motor. Attached to outlet passage is an applicator or tip dispenser such as a removable and replaceable dispensing needle.

10 Claims, 3 Drawing Sheets

DISPOSABLE ROTARY MICROVALVE

BACKGROUND OF THE INVENTION

1. Field of Invention

The present invention relates to positive displacement rotary microvalves and more particularly to an improved self-contained valve having a disposable feed insert, the valve being capable of controlled and repeatable and accurate dispensing of fluid materials of various types and viscosities and in various forms, such as beads, dots and the like.

2. Description of the Prior Art

Positive displacement rotary microvalves are known for dispensing fluid materials such as adhesives, epoxies, potting compounds, SMT adhesives, two part adhesives, silver and gold filled adhesives, UV curable adhesives, and solder pastes (with solids dispersed therein) and the like in a repeatable and accurate manner. Typically, these dispensers for fluid material are used in a wide variety of industries, e.g., electronic assembly and repair, form in place gasketing, component assembly and sealing, mold making, casting, tool and machine and equipment fabrication and assembly, SMT repair, and a variety of other uses.

These prior art dispensing devices typically include a gear motor which controls the rotation of a feed screw supported in a housing. Fluid is fed to the housing from an external source and, in general, air pressure is used to maintain pressure on the fluid and to force the fluid material into the housing. Supported in the housing for rotation by the motor is a feed screw or auger which urges the fluid material into a dispensing tip which is affixed to the output end of the housing. The dispensing tip is essentially in the form of a pointless needle which is locked and sealed to the output end of the housing. Such units are commercially available from Techcon Systems, Inc. Of Carson, Calif. and Asymtek of Carlsbad, Calif., for example.

A valve generally of the above type is disclosed in U.S. Pat. No. 5,564,606 of Oct. 15, 1996. The valve of that patent includes a rotary screw of a variable pitch type which homogenizes low viscosity material and which compresses the material to reduce its volume. That patent also discloses a one piece housing having a sleeve located in the bore and which extends only partly up the bore area. The housing also includes a passageway formed in the housing through which the fluid flows and which is in contact with the passage wall as the fluid is urged into the bore. The portion of the bore above the sleeve may be contacted with the fluid since there is no seal between the upper portion of the bore and the sleeve, i.e., there can be back flow into the region of the bore above the sleeve. The housing also includes a screw which holds a dispensing coupling and thus the sleeve in the bore, a gasket being provided between the dispensing coupling and the lower portion of the sleeve.

It is also the case that while the prior art microvalve dispensers operate satisfactorily, there are circumstances which require improvements which can be made. For example, the dispensers are normally used continuously in assembly line and commercial operations except during lunch breaks and after a shift is over. If the material being dispensed hardens in the microvalve or degrades for any reason, then the valve has to be cleaned out and this is a difficult operation, if it can be done at all at the site. Should such hardening occur, the unit is often sent back to the supplier for cleaning and this may be expensive. The repair of such a microvalve dispenser may cost anywhere from a few hundred dollars to over a thousand dollars, depending on what has to be cleaned and/or replaced. The real problem, however, is that there may not be readily available another microvalve dispenser to use in place of the one to be repaired. The result, in the absence of an immediate replacement, is that the portion of the assembly line or that aspect of the operation may have to be shut down. With the advent of automated and robot controlled equipment, the result of a shut down or suspension of one part of the assembly line can have serious and adverse effects on other portions of the assembly operation.

It is also the case that the materials dispensed may change during the day so that later dispensed material is contaminated by that previously dispensed or is incompatible with that previously dispensed. In such a case, the contamination must be cleaned out and this, again, is difficult to do on site, if it can be done at all. This may lead to the same problems noted in the case of cleaning hardened material. In some instances, users have adopted the policy of cleaning out the microvalve dispenser at the end of the day or whenever dispensed materials are changed. This takes time and requires skilled personnel.

Whatever the problem, hardening or incompatibility, the prior art devices normally include an interior housing surface which is contacted by the fluid being dispensed. Thus, cleaning or repair may involve removing the housing from the motor and discarding it for a new or rebuilt housing and interior components. If the interior housing can be cleaned, it is usually necessary to remove it from the motor and to disassemble the housing and clean each of the parts thereof.

In the case of the valve of the patent referred to previously, the housing and valve structure are such that removal of the sleeve can be a problem, especially if the material hardens in the sleeve-bore area or in the portion above the sleeve or in the exposed passageway in the housing used to feed material into the bore.

It is thus desirable and it is an object of this invention to provide a rotary microvalve dispenser in which the interior fluid contacted surfaces can easily be removed from the housing and replaced so as to avoid having fluid contact with the housing body and thus avoid the need to send the unit back to the supplier for cleaning and/or repair due to hardening or contamination in the bore of the valve.

It is also an object to provide an easily replaceable and disposable "wet end" in a rotary microvalve dispenser which can easily be replaced on site, without the necessity of sending the unit back to the manufacturer for cleaning and/or repair.

It is also an object of this invention to provide a fluid dispenser having a disposable wet end supported in a housing wherein none of the fluid being dispensed is in contact with the interior walls of the housing or infeed passages of the housing but which contacts only the interior surfaces of the removable insert forming the wet end.

It is a further object of this invention to provide an improved microvalve dispenser for use with fluids of various compositions and viscosities and which eliminates the need for cleaning of the interior surfaces of the prior devices which are wetted or come in contact with the fluid by the use of a removable and replaceable wet end insert which is easily removed and replace on site.

SUMMARY OF THE INVENTION

The above and other objects of this invention are accomplished by a much improved and relatively simple microvalve structure in which all of the interior surfaces which come into contact with the fluid being dispensed are readily replaceable therefore reducing costs of cleaning and repair and reducing down time in assembly and commercial operations.

In accordance with the present invention, the microvalve includes a conventional gear driven motor unit to which is mounted a housing for the valve. Supported within the housing is a disposable insert chamber which forms the interior "wet" surfaces of the dispenser. The insert includes a feed arm through which fluid under pressure from an external source is fed to the interior of the insert and thus the fluid does not contact the feed arm surfaces of the housing of the microvalve. Located in the insert is a feed mechanism, connected to and driven by the motor, to dispense a measured amount of fluid accurately and as controlled by the motor.

The motor includes an output shaft for driving a helical screw or auger supported for rotation in the insert. Fluid in a measured amount, depending on the rotational speed and configuration of the screw is urged out of an outlet which forms the exit passageway of the insert. Mounted on the output of the outlet is a tubular dispenser tip device, essentially in the form of a needle but without a point. The dispenser may dispense a bead of a given dimension or a dot, again of a given dimension. The dimension of the bead or dot may vary based on the internal diameter of the dispenser tip and other well known factors such as pressure and feed rate of the fluid, for example.

Numerous other objects and advantages of the present invention will become apparent from the following specification, which, together with the accompanying drawings describes and illustrates preferred embodiments of this invention.

DETAILED DESCRIPTION OF THE INVENTION

Figure 1:
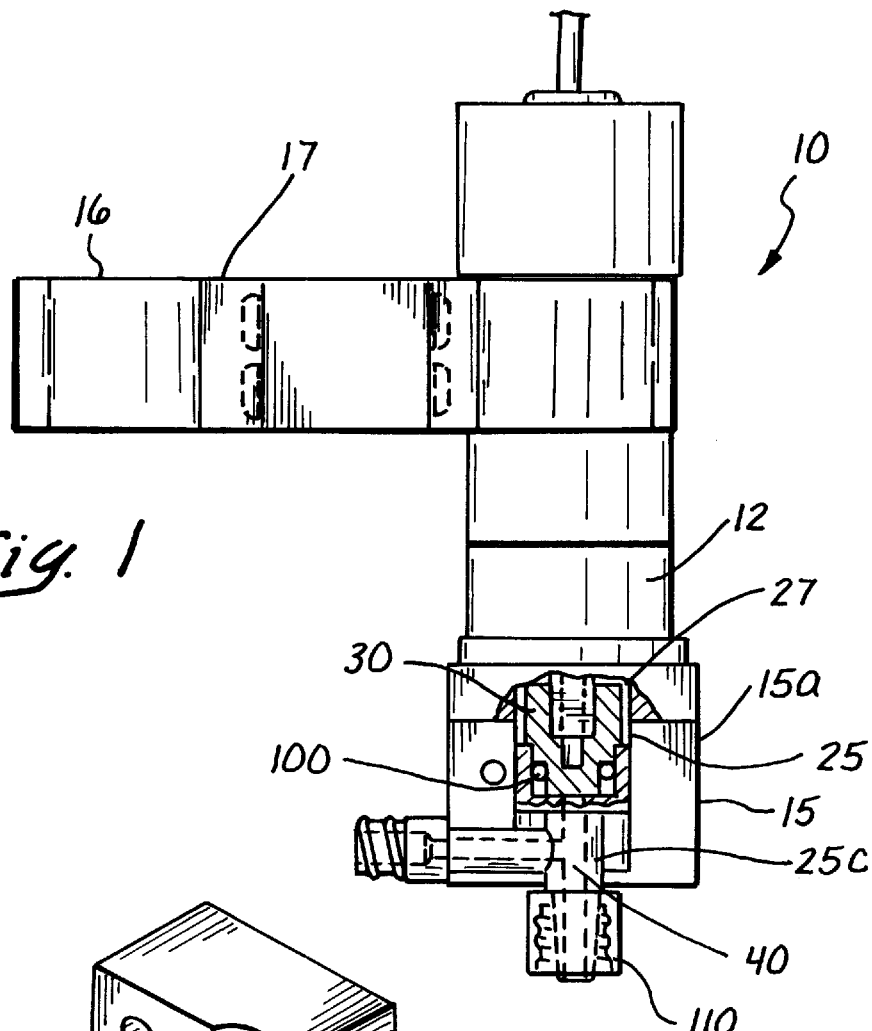
FIG. 1 is a view in perspective of the microvalve dispenser in accordance with this invention.
Figure 2:
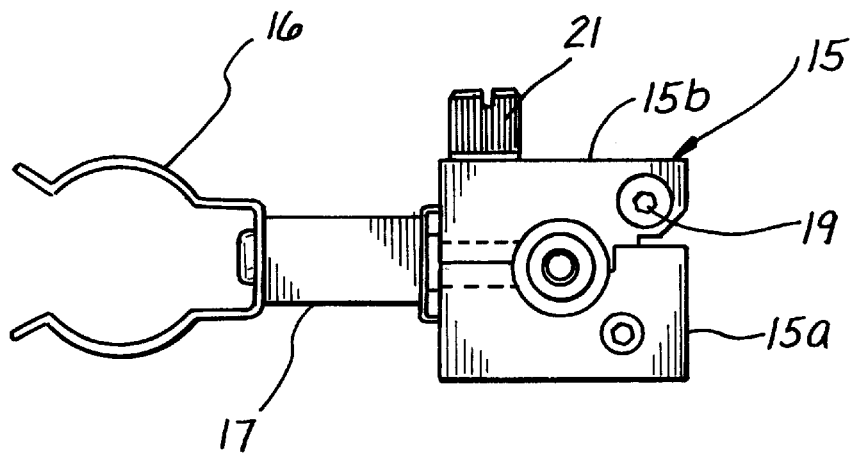
FIG. 2 is a view of the underside of the microvalve dispenser of FIG. 1.
Figure 3:
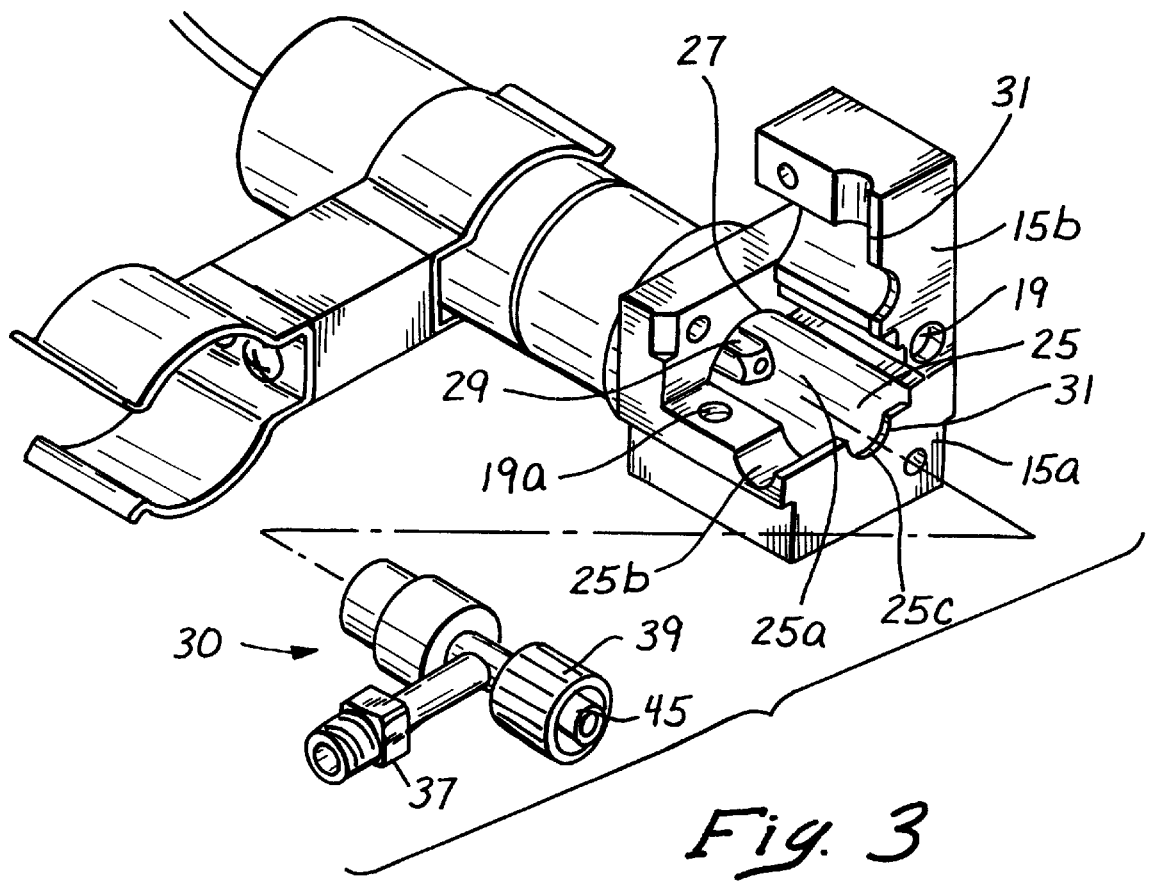
FIG. 3 is a view showing the housing in the open position, with the disposable insert removed.

Referring to the drawings which illustrate a preferred form of this invention, FIGS. 1 through 3 illustrate a microvalve dispenser assembly 10 which includes a gear motor 12 having a housing 15 mounted thereon. Also shown are accessories such a spring clamp 16 and bracket 17, both supported by the motor for mounting the valve assembly on various equipment for motion in an X-Y-Z direction, for example. The gear motor may be any one of either a direct current servo or stepper type and of a suitable wattage to provide motor RPM rates of 1–500 rpm. The motor may be controlled by a controller mechanism, well known in the art, for example, a Model TS5100 from Techcon Systems, Inc.

The microvalve dispenser may be used to dispense accurately any one of the materials previously mentioned as dots down to 0.010 of an inch in diameter or smaller at rates of 5 or more per second. Alternatively, continuous beads of 0.010 of an inch to 0.050 of an inch or larger and at rates of 4 inches per second may be dispensed. The dispensed fluid may have a viscosity of as low as 30K cps to as high as 1 million cps. It may also be used for products with 90% metal and 10% binder in the flux.

The housing 15, which may be of metal such as aluminum, or a corrosion resistant plastic such as acetal, for example, may be made up of a main housing body 15a and a body front plate 15b, the latter being hinged at 19 to pivot away from the main housing body 15a upon release of the captive screw 21 which is threaded into an aligned and threaded opening 19a in the main housing body, as shown. It is understood that other mechanisms may be used to secure the housing in a closed position while permitting the housing to be opened.

Figure 4:
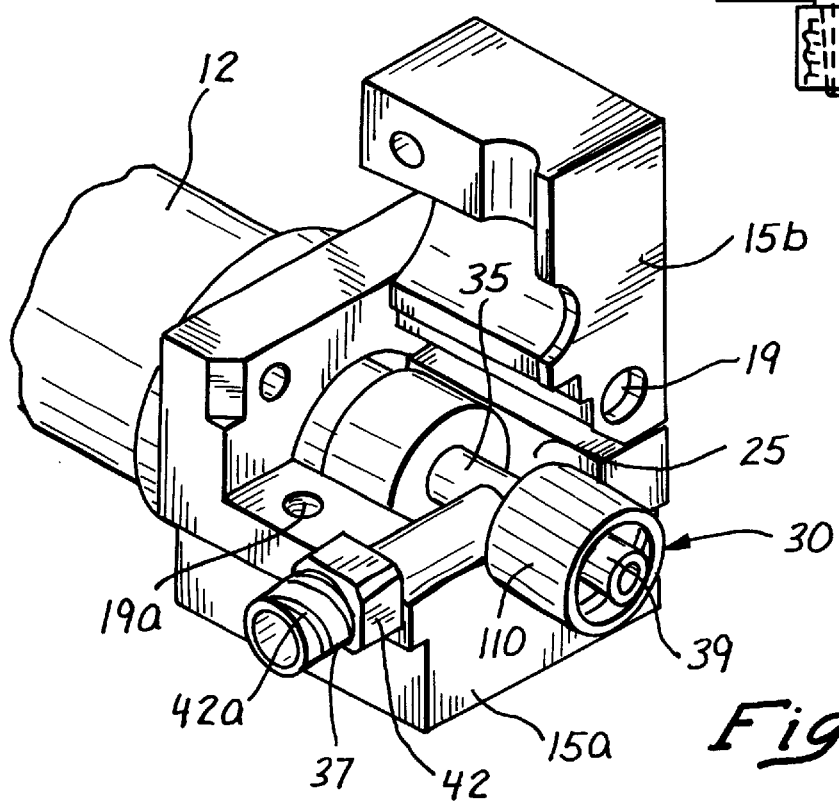
FIG. 4 is an enlarged view, partly in section and partly in elevation of the housing and interior components of the housing, with the housing opened, of the microvalve dispenser of FIG. 1.

As seen in FIGS. 1–3, the main body housing 15a and the front body plate 15b cooperate to form an internal cavity 25 made up of a main cavity recess 25a and an infeed passageway 25b and an outlet cavity or passageway 25c. The inlet and outlet cavities are formed as one half openings in each of the main body housing and front body plate for ease of manufacture and assembly, although the cavities and passages need not be each formed as one half in either the main body housing or feed passages. The main cavity recess is also formed as a one half opening in each of the main body housing and front body plate. Thus, upon unthreading of the captive screw or other mechanism for releasing the housing sections, the entire functional end fluid receiving portion of the housing is exposed, including the infeed passage described, as seen in FIG. 4. Extending into the upper end 27 of the main cavity recess 25 is the drive shaft output 29 of the motor. The entire main cavity recess 25 and the inlet and outlet cavities are dry in the sense that none of the fluid being dispensed comes into contact with the walls of these cavities. The inlet and outlet cavities are merely openings to receive conduits, as will be described.

As seen in FIGS. 1,3 and 4, received in the housing and in the internal cavity 25 of the housing 15 is a disposable dispenser insert 30, the latter basically forming a chamber complimentary to the main cavity recess and the infeed passage and the lower portion of the outlet cavity. The interior walls of the dispenser insert 30 are the only portions wetted by the fluids. The fluids are retained in the chamber of the insert and never contact any of the wall portions of the cavity of the housing or the housing infeed passage in the normal course of operations.

Figure 5:
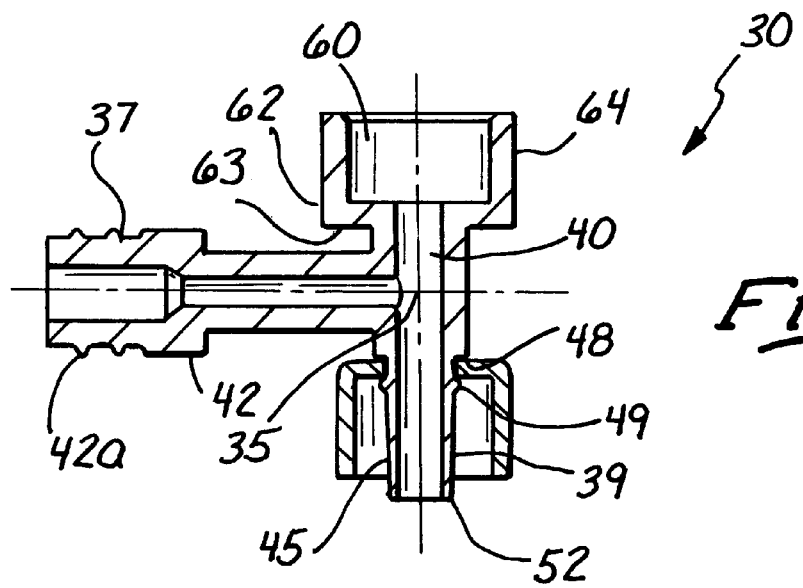
FIG. 5 is a view in section of the disposable chamber insert received in the housing of the microvalve in accordance with this invention.

In the form shown, the insert 30 illustrated in FIGS. 4 and 5 is composed of several components or segments, the primary component being the feed screw chamber 35. The screw chamber 35 includes an inlet 37, an outlet 39 and a material bore 40. In a preferred form, the total insert 30 and the component parts thereof are made of one integral piece to prevent escape of fluid into the space between the outer wall of the insert and the interior walls of the housing and feed passages. The insert 30 is preferably molded of plastic, preferably corrosion resistant and which can be relatively easily molded to controlled and accurate dimensions. Thus, for example, the portion of the insert which receives the feed screw is preferably accurately formed in axial and diameter dimensions for cooperation with a feed screw, also accurately formed, so that there can be accurate control of the dimension of the dot or bead formed during dispensing.

As shown in FIG. 5, the inlet portion 37 of the insert 30 includes an outer circumferential shoulder 42 which extends beyond the housing and which is received on the outside wall of the housing 30, see FIG. 4, thus preventing lateral movement of the insert relative to the housing. The outer surface 42a of the shoulder 42 is preferably threaded so that a fluid supply source may be easily attached and removed. Since the housing 25 is separable or capable of being opened, the housing effectively clamps the infeed passage in place by butting the shoulder 42 and confining the infeed passage of the insert in the infeed passage of the housing 25 to prevent lateral movement of the insert. The lower portion of the housing effectively includes a lower lip 31 on each of the body housing 15 and front plate 15a, effectively forming a lower support for the infeed portion 37 (see FIG. 3) and to provide lower support for the inlet portion 37 of the insert 30. Such support assists in preventing distension of the infeed portion 37 in those instances in which the fluid being dispensed is fairly viscous and somewhat higher pressure is needed to assure proper feeding of the fluid. In this way, fluid entering the dispenser flows directly into the infeed passage 37 of the insert 30 and never contacts the wall of the inlet passage in the housing.

In similar fashion, the outlet passage 39 extends beyond the outlet end of the housing and includes extending portion 45, the latter including a circumferential shoulder 48, see FIG. 5, close to the housing body and an axially spaced shoulder 49 which is tapered in configuration, i.e., the upper portion closer to shoulder 48 is greater in diameter that the portion of the shoulder facing the outlet end 52. This tapered shoulder is used to mount a removable dispensing tip 55, FIG. 7, on the outlet end of the insert. Shoulder 48 is received within the housing and assists in locating and securing the insert 30 in place and against axial movement when the housing sections are closed.

Disposed oppositely of the outlet end 45 of the insert 30 is a formed cavity 60 which receives the helical screw assembly to be described. The outside surface 62 of the base 63 of the cavity 60 forms another shoulder which is received within the housing, the side walls 64 of the cavity being positioned against the opposed walls of the cavity of the housing. The cavity is preferably circular in shape as is the outer surface of the portion 64 so as to mate with the corresponding opposed portion of the housing, as seen in FIG. 1, to receive a feed screw 70 as will be described in detail in FIG. 6.

Figure 6:
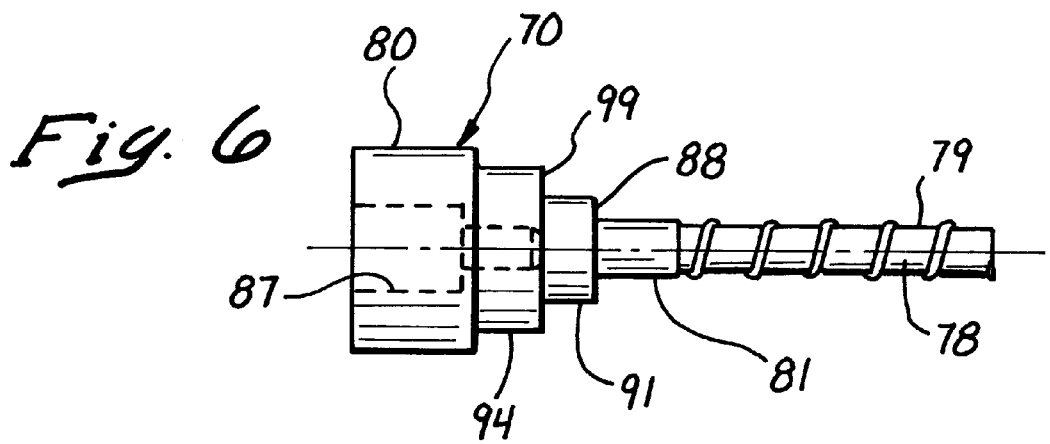
FIG. 6 is an enlarged view of the helical screw which is received within the dispenser housing.

The feed screw 70, shown in FIG. 6, is fabricated of a corrosion resistant high strength plastic, such as acetal and the like, and is fabricated of one piece. A preferred form of fabrication is by machining or injection molding, using high precision molds, to assure accurate dimensions of the components, especially the threaded end of the feed screw. One end 78 of the feed screw includes a helix, as shown, preferably with a left hand thread and having a fine pitch configuration. The threads are preferably square in section and extend radially of the body 79 of the threaded end of the feed screw. The end 81 opposite the threaded end of the feed screw is generally circular in section to be received in the cavity 60 of the insert 35. The major diameter of the helix is just slightly smaller than the bore into which the helical end of the feed screw is received. The flight of the helix is preferably uniform along the length although other types may be used.

The end 80 of the feed screw forms the driving end 84 of the feed screw and includes an internal driving socket connection 87 which may be square or hexagonal. Received within the driving socket 87 is a drive key attached to the end of the drive shaft 29 of the motor, the end configured to form a driving connection with the feed screw 70. The intermediate section 88 is unthreaded and is adjacent a first annular shoulder 91, the latter somewhat greater in diameter than t he diameter of the intermediate section. Between the end 80 and the annular shoulder 91 is a second annular shoulder 94, the latter larger in diameter than shoulder 91 but somewhat smaller in diameter than the end 80 of the feed screw. The annulus surrounds the shoulder 91 and is effectively enclosed by face 99 of the second shoulder and cooperates with the opposed surface of the cavity 60 to form a seal chamber, preferably for an O-ring seal element 100 shown in FIG. 1. Thus, face 99 compresses the O-ring axially, while the outer surface of shoulder 91 forms an inner seal surface with the portion of the wall 60 forming the outer seal surface.

Figure 7:
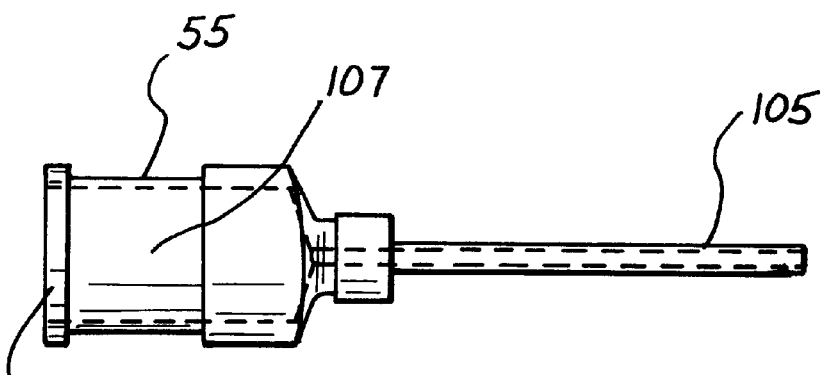
FIG. 7 is a perspective view of the removable dispenser tip in accordance with this invention.

FIG. 7 illustrates one form of a dispenser tip 55 basically including a blunted needle tip 105 of appropriate bore diameter. The tip 105 is mounted on a Luer lock unit 107 which is screwed into a mating and threaded mount collar 110 which is snap fitted over and secured to the shoulder 49, forming a male Luer lock coupling tip, see FIGS. 1 and FIG. 3. The end 115 of the dispenser tip is screw threaded into the mating mount collar 110 for easy removal and replacement. Other arrangements may be used, as is known in the art.

It is thus apparent that an improved microvalve dispenser is described which has many advantages over prior art microvalves. It is also apparent that various modifications may be made with respect to the microvalve disclosed, as will be apparent to those skilled in the art and that such modifications are deemed to be part of the invention, as set forth in the appended claims.

What is claimed is:

1. In a microvalve dispenser for fluids wherein the fluids are dispensed accurately and may be dots, beads or shapes of a predetermined dimension, the dispenser including a housing and a motor mounted on said housing, said motor having an output shaft for driving a component supported in said housing, the improvement comprising:

the housing having an infeed passage, a chamber and an outlet passage, said housing being openable from a closed position to an open position to expose the interior portions of the passages and chamber of said housing, means releasably securing said housing in a closed position from an open position in which in the open position the interior portions of said passages and said chamber of said housing are exposed, a disposable insert supported in said housing and including a fluid inlet having an opening for receiving fluid to be dispensed, said insert including a bore communicating with said inlet opening for flow of fluid into said bore, said insert including an outlet communicating with said bore for discharge of fluid material out of said bore, said insert including outer surface portions which are in opposed facing relationship with the chamber and the infeed and outlet passages thereof, means within the bore of said insert and driven by the output shaft for urging fluid in said bore into said outlet of said bore, and said insert being removable from said housing upon opening thereof whereby said insert may be replaced with another insert.

2. A microvalve dispenser as set forth in claim 1 wherein said urging means in said insert is a feed screw having a helical thread which is driven by the output shaft of the motor.

3. A microvalve dispenser as set forth in claim 1 further including a dispenser tip affixed to the outlet of said insert for dispensing a controlled amount of fluid material.

4. A microvalve dispenser as set forth in claim 1 wherein said housing is a multipart housing which, when disassembled permits withdrawal of the disposable insert from the housing.

5. A microvalve dispenser as set forth in claim 2 wherein said feed screw includes a seal for sealing the feed screw to the inside wall of said insert.

6. A microvalve dispenser as set forth in claim 5 wherein said fluid inlet opening of said insert is located between the seal for the feed screw and the outlet of said insert.

7. A microvalve dispenser as set forth in claim 1 wherein said disposable insert is composed of a corrosion resistant plastic.

8. A microvalve dispenser as set forth in claim 2 wherein said helical screw is formed of a corrosion resistant plastic.

9. A microvalve dispenser as set forth in claim 1 wherein said insert is formed in one piece and the urging means within said insert is formed in one piece.

10. A microvalve dispenser as set forth in claim 1 wherein the outlet of said insert extends beyond the housing and wherein said dispenser tip is affixed to the portion of said outlet which extends beyond said housing.

\* \* \* \* \*